United States Patent [19]
Hauner

[11] Patent Number: 5,339,615
[45] Date of Patent: Aug. 23, 1994

[54] DEVICE TO MOVE SPINNING CANS

[75] Inventor: Friedrich Hauner, Ingolstadt, Fed. Rep. of Germany

[73] Assignee: Rieter Ingolstadt Spinnereimaschinenbau AG, Ingolstadt, Fed. Rep. of Germany

[21] Appl. No.: 984,875

[22] Filed: Dec. 2, 1992

[30] Foreign Application Priority Data

Dec. 12, 1991 [DE] Fed. Rep. of Germany ....... 4141033

[51] Int. Cl.$^5$ .............................................. D01H 9/18
[52] U.S. Cl. .................................. 57/281; 19/159 A; 198/464.4; 198/718
[58] Field of Search .......................... 57/1 R, 90, 281; 19/159 A; 198/464.4, 479.1, 718, 723

[56] References Cited

U.S. PATENT DOCUMENTS

| | | | |
|---|---|---|---|
| 1,069,870 | 8/1913 | Gaynor | 198/464.4 |
| 2,013,144 | 9/1935 | Gladfelter | 198/464.4 X |
| 2,295,441 | 9/1942 | Wiedinger | . |
| 2,985,283 | 5/1961 | Carter | 198/464.4 X |
| 3,249,968 | 5/1966 | Whitehurst | 19/159 A |
| 3,323,177 | 6/1967 | Binder et al. | 19/159 A |
| 3,354,513 | 11/1967 | Fornes | 19/159 A |
| 3,386,134 | 6/1968 | Munroe et al. | 19/159 A |
| 4,002,231 | 1/1976 | Doty | 198/464.4 |
| 4,059,185 | 11/1977 | Weber | 19/159 A X |
| 4,469,214 | 9/1984 | Maurer et al. | 57/281 X |
| 4,683,619 | 8/1987 | Langen et al. | . |

FOREIGN PATENT DOCUMENTS 2230930 10/1973 Fed. Rep. of Germany .

Primary Examiner—Joseph J. Hail, III
Attorney, Agent, or Firm—Dority & Manning

[57] ABSTRACT

The invention relates to a device to convey spinning cans from a first into a second position by a movable traveller. The traveller intersects the projection of housing sections and/or of the can guides on the plane of the movement of the traveller. An actuating device for a switch is installed in the direction of movement of the traveller between the traveller and the projection on the housing section and/or the can guide to stop the movement of the traveller.

13 Claims, 3 Drawing Sheets

DEVICE TO MOVE SPINNING CANS

BACKGROUND OF THE INVENTION

The present invention relates to a device for moving spinning cans from a first into a second position by means of a movable traveller and housing elements and/or can guides, and in particular to a device whereby the traveller intersects in its movement the projection of the housing elements and/or can guides on the plane of the traveller's movement.

A great variety of devices for moving spinning cans on carding machines, drawing frames, or can conveyors are known. Thus, a drawing frame is known on which empty spinning cans are taken up by a turnstile and are moved from a reserve station into a filling station. Additional rotational movement conveys the turnstile from the filling station into an additional reserve station from which the filled spinning can is removed from the drawing frame.

Furthermore, can replacement devices are known which move spinning cans by means of a linear traveller from a first reserve station via a filling station into another reserve station.

All these can replacement devices have in common that they enter into openings in the housing or of the can guides either during the movement of the cans or when being lifted back from outside the housing or the can guides. During such movements the danger exists that the persons or objects in movement range of the traveller may be squeezed in between traveller and housing and/or can guides.

OBJECTS AND SUMMARY OF THE INVENTION

It is therefore a principle object of the instant invention to create a can moving device in which the danger of injury to persons or damage to wedged-in objects is avoided.

Additional objects and advantages of the invention will be set forth in part in the description which follows, and in part will be obvious from the description, or may be learned by practice of the invention.

The objects of the invention are attained in that an actuating device for a switch is installed between the traveller and the projection on the housing element and/or the can guide in the direction of movement of the traveller in order to stop the movement of the traveller.

The invention makes it advantageously possible for the wedged-in object to be pressed by the traveller against the housing and/or the can guide on which the actuating device to switch off the movement of the traveller is installed. The movement of the traveller can thus be switched off immediately in case of an impediment. In addition, the advantageous possibility is provided for the operation of the traveller to be switched off rapidly by an operator, in case of an emergency situation for instance, since the actuating device is accessible from many positions.

The actuating device is used especially advantageously if the traveller is a turnstile. With turnstiles especially, the danger exists that the rotating arm may catch an object and move it into critical range of the device.

A cord extending alongside the housing at a distance from the housing has proven to be an advantageous actuating device. The cord is connected to a switch to stop the movement of the traveller. When the cord is displaced, e.g. when an object is pressed by the traveller against the cord, the switch is actuated and the movement of the traveller is stopped immediately.

To secure several housing edges or can guides, the deflection of the cord in grooved rollers has been shown to be especially advantageous- It is then possible to secure several housing edges or can guides with only one switch.

An especially high level of safety is obtained if the switch stops the movement of the traveller when the cord is stressed and also when it is unstressed. This provides additional safety by interrupting the movement of the traveller also when the cord has torn, for example, or has stretched so much that reliable triggering of the switch would no longer be guaranteed in the case of a wedged-in object.

If the cord is to actuate the switch when deflected in the direction of the housing, it is advantageous for the cord to be at a sufficient distance from the housing or from the can guide so that an actuation of the switch is ensured even if the cord is deflected in direction of the housing and/or of the can guide.

The accompanying drawings constitute a part of the specification and illustrate embodiments of the invention and, together with the description, serve to explain principles of the invention. Elements of one embodiment of the figures are interchangeable in other embodiments in the figures, as are elements having like designations, so long as the combination of elements is covered by the appended claims.

DESCRIPTION OF THE PREFERRED EMBODIMENTS

Reference will now be made in detail to the presently preferred embodiments of the invention. Each example is provided by way of explanation of the invention, not limitation of the invention. It will be apparent to those skilled in the art that various modifications and variations can be made in the invention without departing from the scope or spirit of the invention, and it is intended that the present invention cover such modifications and variations as come within the scope of the claims and their equivalents.

Figure 1:
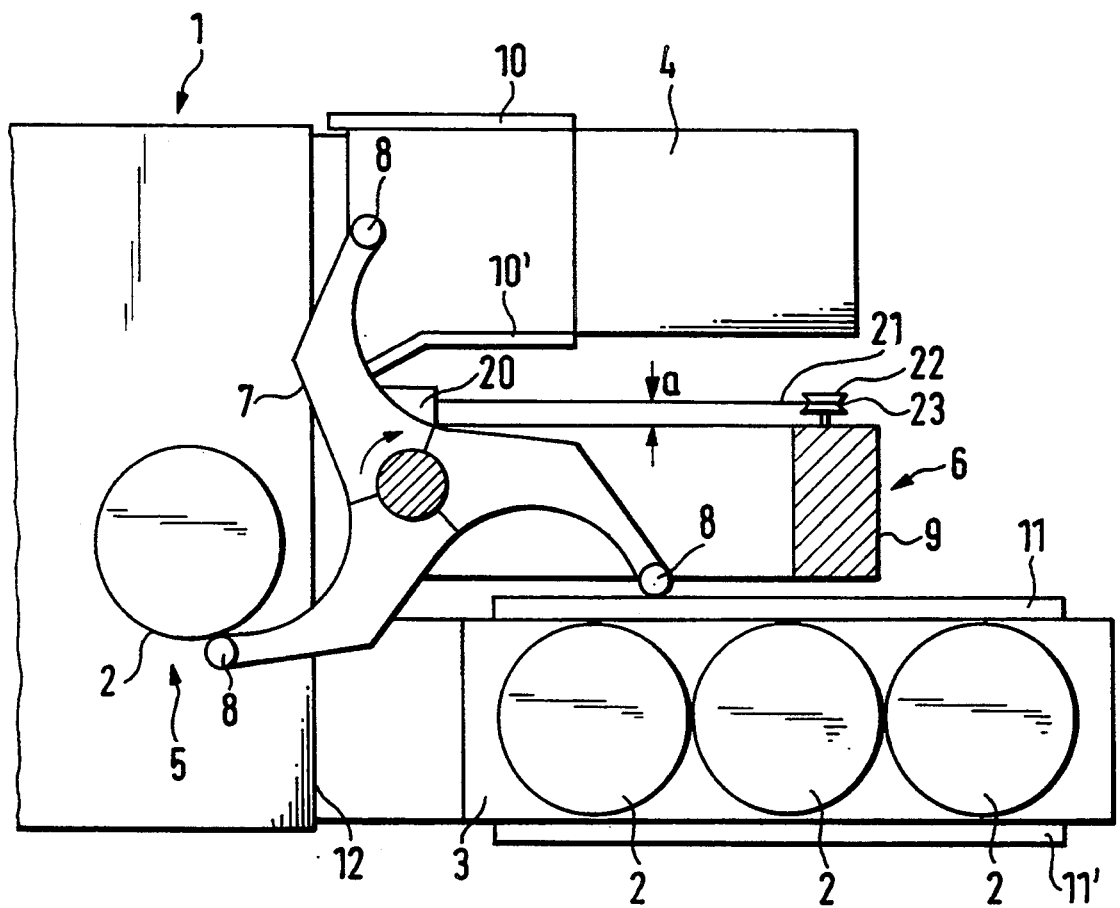
FIG. 1 shows a top perspective view of a device according to the invention.
Figure 1A:
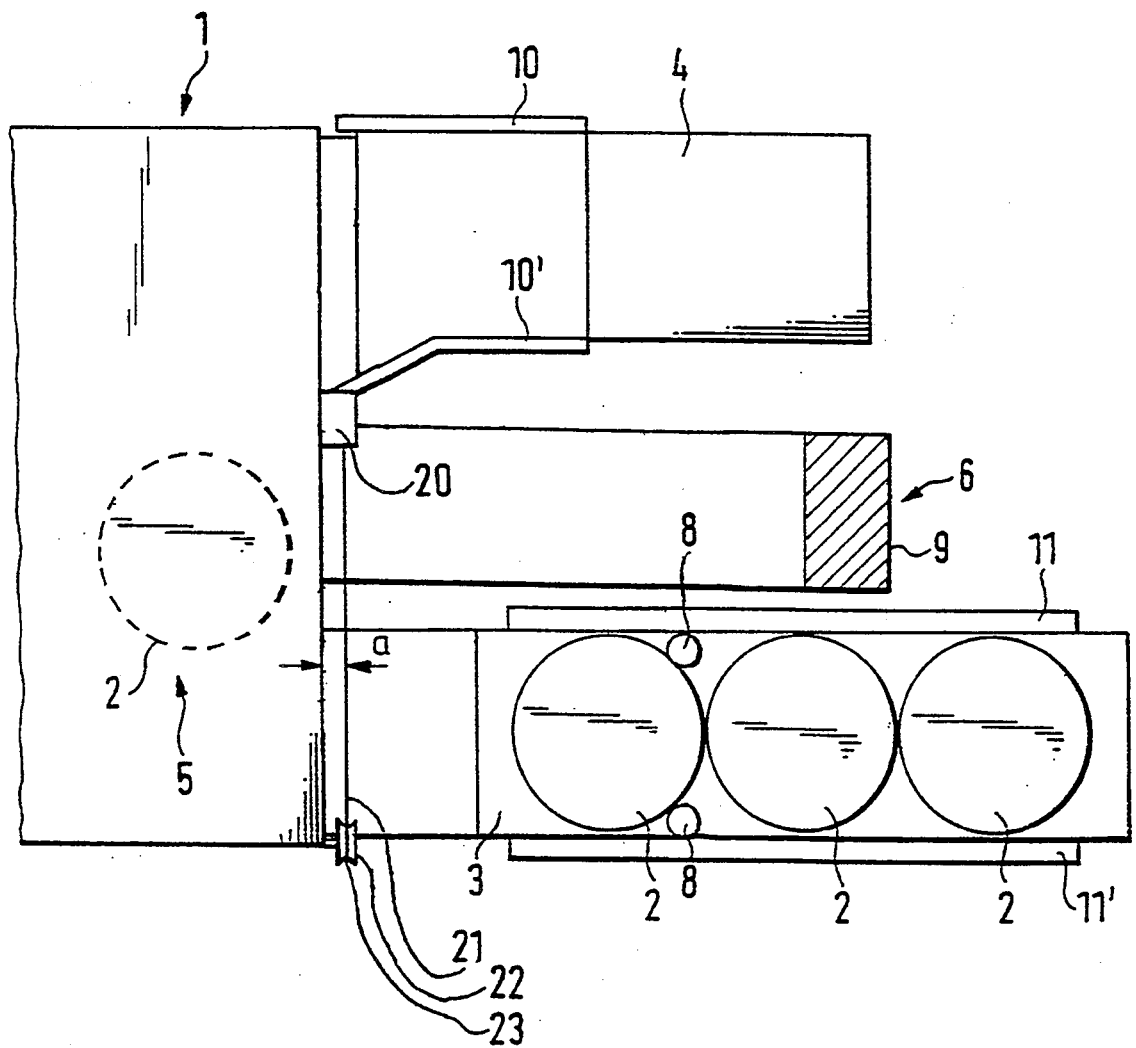
FIG. 1a. shows a top perspective view of the device incorporated with a linear can transport system.

FIG. 1 shows a top view of the device according to the invention. A can replacing device 6 is assigned to a textile machine 1, e.g. a drawing frame. Spinning cans 2 are conveyed in the can replacing device 6 for admission to a filling station 5. The cans 2 near admission position 3 are guided by a railing which serves as the can guide 11, 11'. Near the removal device 4 the cans are guided by flanges on the floor serving as can guides 10, 10'.

A turnstile 7 is installed on the can replacing device 6 to move the spinning cans 2. As the turnstile 7 rotates, an arm 8 seizes a spinning can 2 in ready position and moves it from the admission position 3 into the filling station 5. The spinning can 2 coming from the filling station 5 is pushed by another arm 8 of the turnstile 7 towards the delivery 4. During the above-described rotational movement of the turnstile 7 in direction of the arrow, the arm 8 which was at the delivery 4 at the beginning of the rotational movement is rotated by a housing 9 of the can replacement device 6 towards the admission 3, In this process the arm 8 intersects the plane projection of housing 9. The arm 8 thus passes through an opening in housing 9 of the can replacing device 6. Furthermore, an arm 8 which was in a ready position in front of admission 3 is first guided through the projection of the can guide 11 and then enters an opening in the housing of the textile machine 1 in this embodiment.

With all these movements of arm 8 the danger exists that persons or objects within swiveling range of arm 8 might become wedged between arm 8 and housing 9 or housing 12 of the textile machine 1 or the can guide 10' or 11.

It is now proposed according to the instant invention that a safety device be installed on the housing elements 9, 12 or on the can guides 10', 11 which are within swiveling range of turnstile 7, on the side on which the turnstile 7 intersects the projection of housing 6, 12 and/or of the can guide 10', 11. A safety device with a switch 20, a cord 21 and deflection rollers 22 has proven to be especially advantageous. The deflection roller 22 is provided with a groove 23. The cord 21 is installed at a distance "a" from housing 9. Cord 21 is connected to switch 20. If an object is pressed against cord 21, traction is exerted upon switch 20, actuating said switch 20 and the rotational movement of the turnstile 7 stops immediately. The wedged-in object can then be removed from the swiveling range of the turnstile 7 and the rotational movement of the turnstile 7 can be resumed.

An additional safety function is advantageously provided in switch 20. In case the cord 21 tears or at least no longer acts upon switch 20 while being under a certain preset tension, switch 20 will also trigger a signal causing the rotational movement of the turnstile 7 to be stopped. This ensures that the turnstile 7 can either not be started up if the safety device is defective, or that damage to an object is in any case avoided during operation by disconnecting the switch.

Of course the safety device with switch 20, cord 21 and deflection roller 22 can also be provided on other critical structural elements of the can replacement device 6 than those shown in FIG. 1, e.g. on the can guide 10' or 11. This is possible either through an additional safety device or, if the construction design permits, via additional deflection rollers which guide the cord 21 alongside the critical locations. It is thus possible to secure large and/or different areas with only one switch 20.

The instant invention furthermore comprises a device which does not displace cans by means of a turnstile 7 but over linear conveyors. It is thus possible for the spinning can 2 to be conveyed by traveller which can be imparted a linear movement and is installed alongside the admission 3 to a filling station 5 and intersects thereby the projection of a housing edge within the plane of traveller movement. The housing edge whose projection is intersected is to be equipped with the safety device according to the invention.

Furthermore the invention is not limited to the application with the can replacing device 6 of a textile machine 1. Linear or rotating can replacement devices are also installed on conveyors which receive cans at textile machines and can discharge them there. Here too a safety device according to the instant invention can be installed if the traveller intersects a projection of a housing edge of the conveyor.

Figure 2:
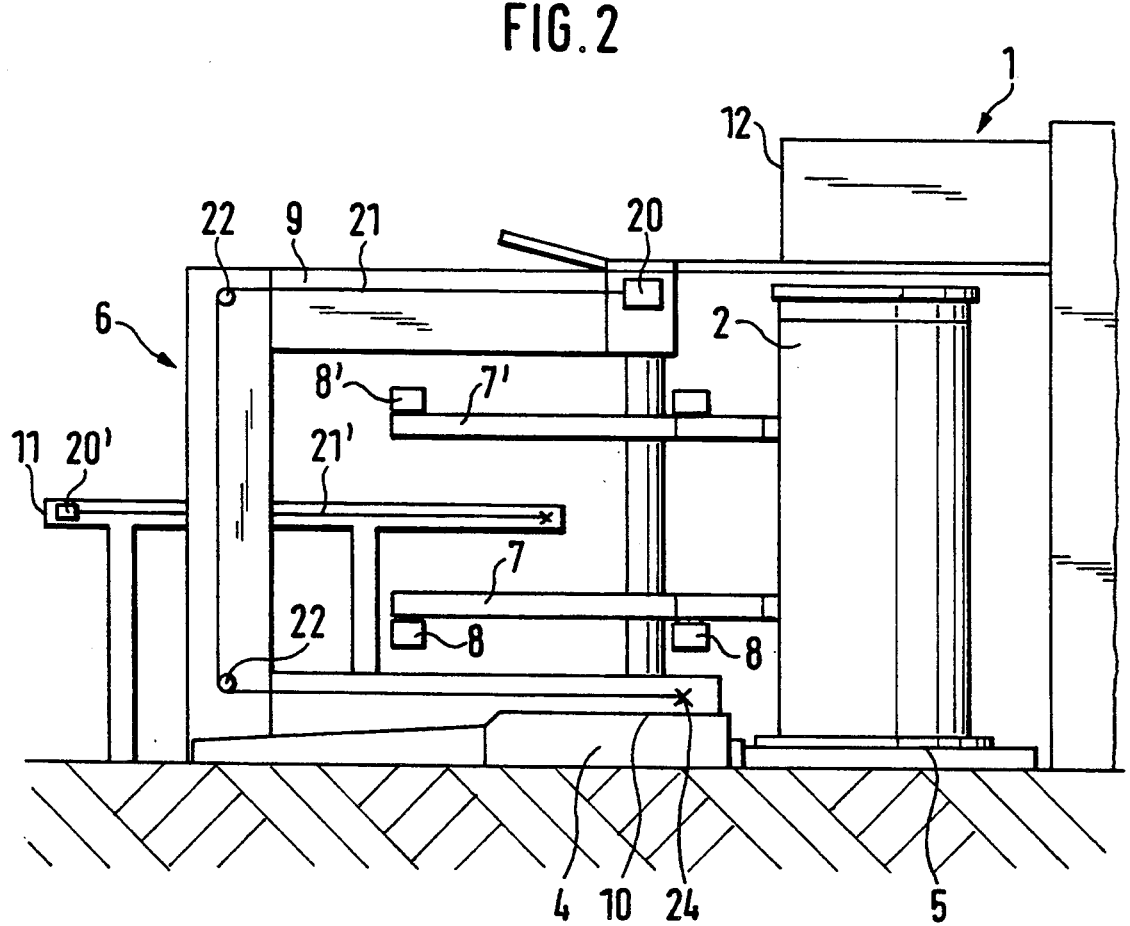
FIG. 2 shows a side perspective view of a device according to the invention.

FIG. 2 shows a side view of a device according to the invention. It can be seen from this representation that the turnstile 7 and 7" is moved with arms 8 and 8' of the can replacing device 6 through openings in housing 9 as well as in housing 12. The spinning can in FIG. 2 is shown below the textile machine 1 and is taken to the discharge 4 with the next rotational movement of the turnstile 7, 7'. In this embodiment, two turnstiles 7, 7' are provided. A fixedly installed can guide 11 is located between the two turnstiles 7, 7'. A safety device with a switch 20' and a cord 21' is assigned to the lateral surface of the can guide 11 which is facing the turnstile 7, 7'. If an object becomes wedged between the turnstile 7, 7' and the can guide 11, the rotational movement of the turnstile 7, 7' is switched off by switch 20' as described in FIG. 1.

While the safety device on the can guide 11 is not provided with a deflection, the safety device on the can replacement device 6 is equipped with deflection rollers 22 on the housing side towards the turnstile 7, 7'. Cord 21 is attached in an anchoring point 24 and extends alongside a lower section of housing 9. An additional deflection roller 22 deflects the cord back into a horizontal course so that the upper side of housing 9 is secured. Cord 21 ends at switch 20. If cord 21 is stressed by an object or is unstressed by being damaged, the switch 20 signals an error to the drive of the turnstile 7, 7' so that the movement of the turnstile is stopped immediately.

Several housing portions which could cause an object to become wedged can be secured by means of one single switch 20 through the advantageous use of deflection cord 21.

I claim:

1. A safety device for use with a textile machine can conveying system having a movable traveller for conveying cans from a first position into a second position the can conveying system having any number of structural components defining vertical planes, the movable traveler intersecting any number of the vertical planes, said safety device comprising:

at least one switch device, said switch device operatively connectable to said textile machine can conveying system so as to substantially immediately stop travel of said movable traveller upon actuation thereof;

at least one deflection pulley disposed generally at the intersection of two of said structural components;

a pre-tensioned relatively flexible actuating device having one end thereof operatively connected to said switch device for actuating said switch device and the other end thereof anchored relative said textile machine, said actuating device disposed offset from and generally along the length of at least one of said structural components whose vertical plane is intersected by said movable traveller so as to be contacted at any point along said structural component by an object carried by said movable traveller thereby actuating said switch device to stop said movable traveller before the object contacts said structural component and;

said switch device configured to also be actuated upon relief of the pre-tension condition of said actuating device.

2. The safety device as in claim 1, wherein said actuating device comprising a flexible cord.

3. The safety device as in claim 2, wherein said flexible cord is disposed in a first vertical position and a second horizontal position along said structural components.

4. The safety device as in claim 1, wherein said actuating device is disposed adjacent at least one can guide of said can conveying system.

5. The safety device as in claim 1, wherein said actuating device is disposed adjacent at least the housing portion of said con conveying system.

6. The safety device as in claim 1, wherein said actuating device is disposed along substantially all of said structural components whose vertical planes are intersected by said movable traveler.

7. The safety device as in claim 6, further comprising at least one additional said safety device configured with at least one additional said actuating device.

8. The safety device as in claim 1, wherein said safety device is configurable with a textile machine can conveying system having a turnstile traveler.

9. The safety device as in claim 1, wherein said safety device is configurable with a textile machine can conveying system having a linear traveler.

10. A textile machine can conveying system for conveying cans through various positions through the textile machine, said can conveying system comprising:

a traveler device for conveying cans through said various positions;

at least one structural component having a vertical plane that is intersected by travel of said traveler device;

a relatively flexible pre-tensioned actuation cord disposed offset from and along substantially the entire length of said structural components; and a switch member operatively connected to said actuation cord, said switch member being actuated by a relative change in the pre-tensioned condition of said actuation cord to stop movement of said traveler device before a body carried thereby becomes wedged against said structural component, said switch member also being actuated upon a loss of tension condition to said actuation cord so as to prevent operation of said can conveying system if said actuation cord is cut or otherwise broken.

11. The can conveying system as in claim 10, wherein said traveler device comprises a turnstile traveler.

12. The can conveying system as in claim 10, further comprising a plurality of said structural components and at least one deflection pulley disposed generally at the intersection of two said structural components, said actuation cord running around said deflection pulley so as to provide simultaneous coverage in opposing directions generally along the length of said structural components.

13. The can conveying system as in claim 10, wherein said traveler device comprises a linear traveler.

* * * * *